(12) United States Patent
Hasenfratz et al.

(10) Patent No.: US 10,233,876 B2
(45) Date of Patent: Mar. 19, 2019

(54) FILTER ELEMENT, IN PARTICULAR, FOR GAS FILTRATION

(71) Applicant: Mann+Hummel GMBH, Ludwigsburg (DE)

(72) Inventors: Robert Hasenfratz, Waiblingen (DE); Fabian Wagner, Moeglingen (DE); André Roesgen, Remshalden (DE); Christian Thalmann, Speyer (DE); Frank Pflueger, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 276 days.

(21) Appl. No.: 15/098,501

(22) Filed: Apr. 14, 2016

(65) Prior Publication Data

US 2016/0220934 A1 Aug. 4, 2016

Related U.S. Application Data

(63) Continuation of application No. PCT/EP2014/071885, filed on Oct. 13, 2014.

(30) Foreign Application Priority Data

Oct. 15, 2013 (DE) ........................ 10 2013 017 034

(51) Int. Cl.
*F02M 35/024* (2006.01)
*B01D 46/00* (2006.01)
(Continued)

(52) U.S. Cl.
CPC ..... *F02M 35/02416* (2013.01); *B01D 46/002* (2013.01); *B01D 46/0005* (2013.01);
(Continued)

(58) Field of Classification Search
CPC .. B01D 46/0005; B01D 46/002; B01D 46/12; B01D 46/521; B01D 2265/02; B01D 2265/025; F02M 35/0215; F02M 35/02416
See application file for complete search history.

(56) References Cited

U.S. PATENT DOCUMENTS 6,312,489 B1   11/2001   Ernst et al.
2006/0174598 A1*  8/2006   Mills .................. B01D 46/002
                                                     55/499

(Continued)

FOREIGN PATENT DOCUMENTS

CN    101111297 A    1/2008
DE    202008013309 U1    3/2009
(Continued)

*Primary Examiner* — Rober Clemente
(74) *Attorney, Agent, or Firm* — James Hasselbeck

(57) ABSTRACT

A filter element, including: a first filter medium body having an outflow side and an inflow side; a second filter medium body having an outflow side and an inflow side; wherein the filter element has a longitudinal axis; wherein the first and second filter elements are configured both install into and share in common a filter element housing in which the filter medium bodies delimit a shared common clean space from which the purified fluid is to be discharged via at least one outflow opening; wherein the first filter medium body and the second filter medium body have different sizes and/or different shapes and/or different angular positions of the outflow sides adjoining the clean space.

17 Claims, 11 Drawing Sheets

(51) Int. Cl.
*B01D 46/12* (2006.01)
*B01D 46/52* (2006.01)
*F02M 35/02* (2006.01)

(52) U.S. Cl.
CPC ........... *B01D 46/12* (2013.01); *B01D 46/521* (2013.01); *F02M 35/0215* (2013.01); *B01D 2265/02* (2013.01); *B01D 2265/025* (2013.01)

(56) References Cited

U.S. PATENT DOCUMENTS

| | | |
|---|---|---|
| 2009/0188217 A1 | 7/2009 | Amann |
| 2012/0159910 A1 | 6/2012 | Mills et al. |
| 2014/0000228 A1 | 1/2014 | Enderich et al. |

FOREIGN PATENT DOCUMENTS

| | | |
|---|---|---|
| DE | 102011083657 A1 | 3/2013 |
| EP | 2135662 A1 | 12/2009 |
| WO | 2013045285 A1 | 4/2013 |
| WO | 2014161933 A1 | 10/2014 |
| WO | 2014177598 A1 | 11/2014 |

* cited by examiner

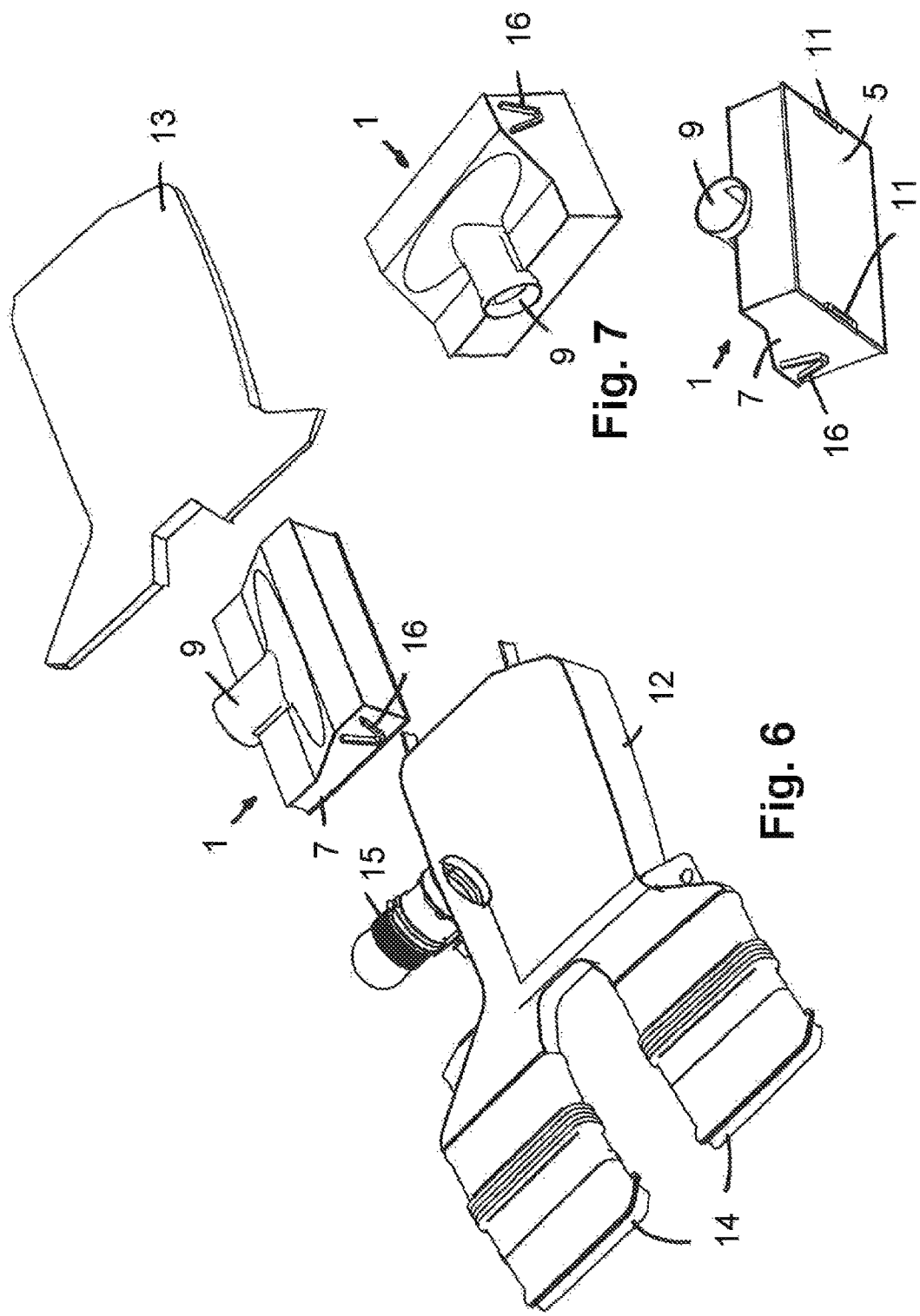

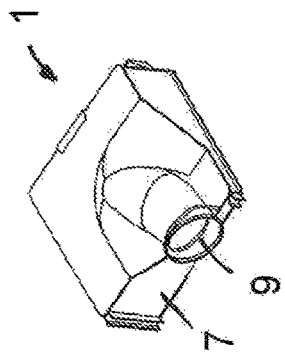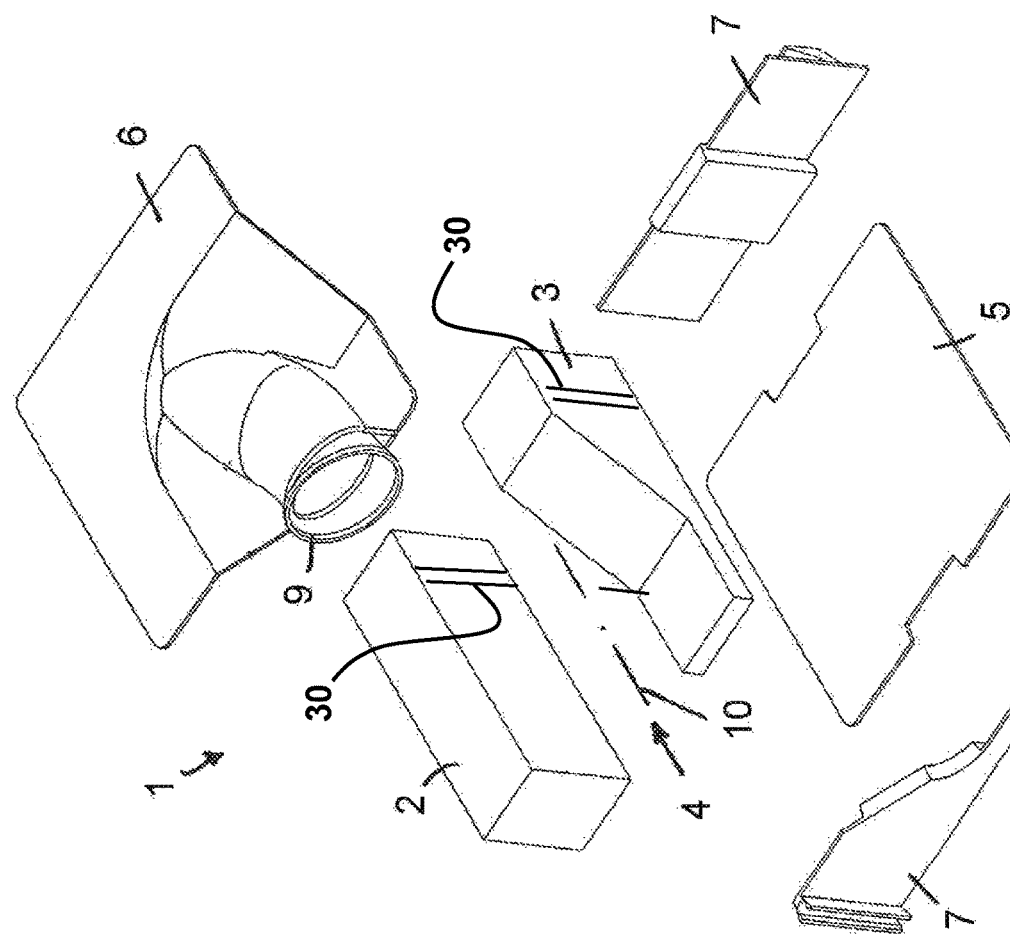

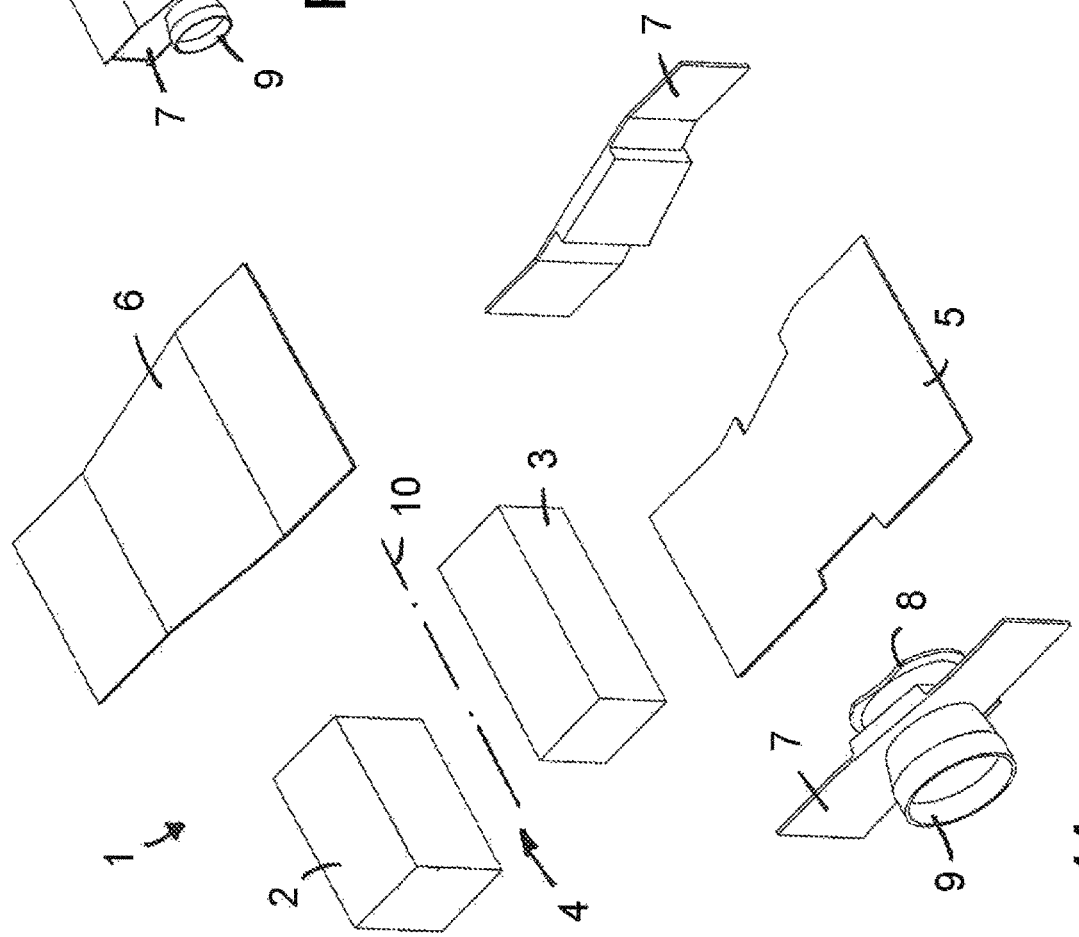

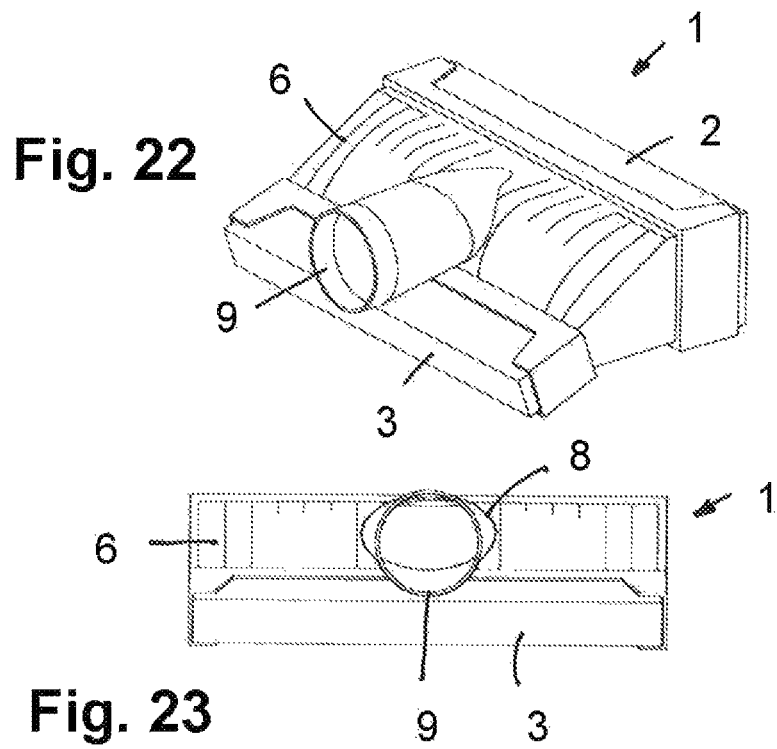
Fig. 22
Fig. 23
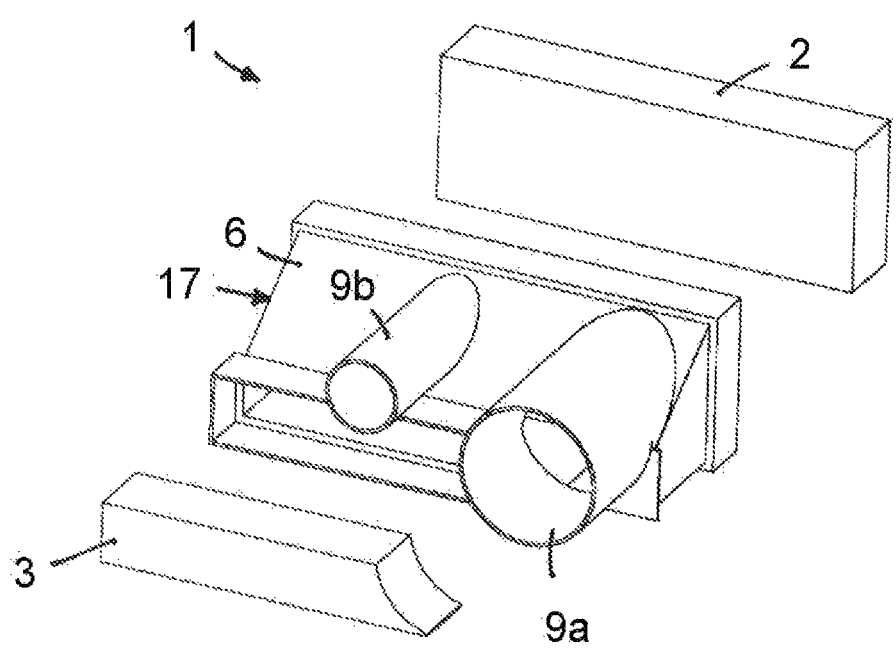
Fig. 24

FILTER ELEMENT, IN PARTICULAR, FOR GAS FILTRATION

TECHNICAL FIELD

The invention relates to a filter element, in particular, for gas filtration, according to the preamble of claim 1.

BACKGROUND OF THE INVENTION

DE 10 2011 083 657 A1 describes a filter element for a fresh air system of a vehicle, the filter element including two separately configured filter medium bodies implemented in the form of pleated filters, which are each cuboid in shape and delimit a common clean space lying therebetween. Air to be purified flows from the outside to the inside through the filter medium bodies, the air being discharged axially via an outflow opening out of the clean space. The pleats of the filter medium bodies run parallel to the longitudinal axis of the filter element, so that the end edges of the filter medium bodies abut against the end face of the filter element, into which the outflow opening of the clean space is inserted.

EP 2 135 662 A1 describes a filter element having a compressible filter medium body that is for filtering a gaseous fluid, is configured in an annular shape, and may be implemented as a pleated filter. The gas to be purified flows radially from the outside to the inside through the filter medium body. The filter medium body is inserted into a housing that can be closed with a cover, wherein the cover can be mounted obliquely onto the housing such that different sections of the annular filter medium body are compressed by the cover to varying degrees of intensity, and the filter medium body has a varying height in the circumferential direction.

SUMMARY OF THE INVENTION

The invention addresses the problem of providing a compactly-configured filter element having high filtration performance.

This problem is solved according to the invention with the features of claim 1. The dependent claims set forth advantageous developments.

The filter element according to the invention is preferably employed for gas filtration, for example, for filtering the combustion air of an internal combustion engine, or for purifying the fresh air supplied to cabins such as, for example, vehicle interiors. Fundamentally, however, use for filtering fluids is possible.

The filter element includes a first and a second filter medium body, which are configured separately from one another and are each implemented as an individual body. The two filter medium bodies are inserted into a common filter element housing of the filter element that forms a carrier body, and delimit a common clean space that lies between the outflow sides or post-filtration sides of the two filter medium bodies. Into the filter element housing, it is possible to insert receiving pockets, into which the filter medium bodies are then inserted. From the clean space, the purified fluid can be discharged out from the filter element via an outflow opening in the filter element housing. The first filter medium body and the second filter medium body differ from one another in terms of the size and/or shape thereof, and/or the angular position of the filter medium body outflow sides adjoining the clean space. This enables flexible adaptation to different installation conditions, so that the filter elements can be adapted to different shapes and different sizes of installation spaces. The filter medium bodies are not identical, and may each be implemented as standard components. It is thus possible, with limited effort, to provide filter elements that make optimal use of a given installation space, thereby improving the filtration performance at the same time.

The different angular positions of the filter medium body outflow sides of the filter medium bodies adjoining the clean space refer, for example, to the longitudinal axis of the filter element and/or the outflow direction through the outflow opening in the filter element housing and/or the central axis of the outflow tube.

The clean space between the two filter medium bodies occupies a central position in the filter element; the entirety of the purified fluid is collected in the clean space, and guided through the outflow opening to the exterior. This reduces the effort of connection for discharging the fluid. Accordingly, when a filter element is replaced, then the clean space is also replaced, as well.

Advantageously, the filter element has precisely two separately-configured filter medium bodies. It is also conceivable, however, to have embodiments having more than two separately-configured filter medium bodies that share one clean space.

According to an advantageous embodiment, the filter medium bodies have different heights, at least in some sections. The filter medium bodies may have the same basic cross-section, e.g., a rectangular cross-section, wherein the filter medium bodies differ from one another in having different heights in some sections. This makes it possible for an outflow tube connected to the outflow opening to run at least partially above the lower of the filter medium bodies. The diameter or position of the outflow tube can hereby be dimensioned such that the outflow tube does not extend up beyond the upper side of the filter element. This achieves a compact design in relation to the height of the filter element, the height being determined by the maximum height of the filter medium bodies.

The central axis of the outflow tube may coincide with the longitudinal axis of the filter element, or may, where appropriate, lie outside the longitudinal axis of the filter element.

The reduced height of the second filter medium body in relation to the first filter medium body is, for example, achieved by having both filter medium bodies be cuboid but possess different heights. It is, however, also possible to design one filter medium body to be in the shape of a ramp in sections, so that this filter medium body has two different height regions that are connected to one another via an obliquely-running ramp. It is also possible to lead the obliquely-running ramp over the entire upper side of a filter medium body.

According to another embodiment, these filter medium bodies have different lengths relative to the longitudinal axis of the filter element. Optionally, the filter medium bodies may be configured so as to be different in a plurality of parameters that determine the size or shape; for example, the filter medium bodies may have different lengths and additionally—at least in some sections—also have different heights.

Alternatively to or in addition to the different lengths or heights, the filter medium bodies may also have different widths.

The basic geometry of the filter medium bodies is preferably rectangular, though it is equally possible for the basic geometry to deviate therefrom; examples including trapezoidal, triangular, round, or partially-rounded cross-sectional shapes, such as, for example, a partially-annular design.

The filter medium bodies may be implemented as pleated filters and be made of, for example, pleated paper or felt. Advantageously, the pleats of the pleated filters or the pleat ridges run at least approximately orthogonally to the longitudinal axis of the filter element and/or to the outflow direction through the outflow opening in the filter element housing and/or to the central axis of the outflow tube. The end edges of the pleats lie adjacent to the clean space on the outflow side. In this embodiment, the end pleats in the pleated filter lie parallel to the end faces of the filter element.

Preferably, the pleated filters have different numbers of pleats. In addition, the pleated filters may preferably differ in that the pleat width or pleat spacing (distance between two successive pleat ridges) of the pleats of one pleated filter are different from the pleat width of the other pleated filter.

For a case where the filter medium bodies are configured as pleated filters, the outflow and inflow sides of the pleated filters are defined by the respective pleat ridges.

The filter element including the at least two filter medium bodies forms one filter insert part, which can be inserted into a filter housing of a filter device. In addition to the filter medium bodies, the filter element or filter insert part advantageously also includes the filter element housing, including a bottom part and cover part between which the filter medium bodies are accommodated, as well as side parts. The filter element forms a continuous unit, which can be inserted as a whole into the filter housing or is to be removed therefrom.

According to other advantageous embodiments, guidance elements that serve to displaceably guide the filter element in the filter housing are arranged on the bottom part or the side part of the filter element. Furthermore, guiding elements which extend at an angle to the bottom of the filter element and with which counter-guiding elements on the housing cover of the filter housing are associated may be arranged on opposite side parts, which may also be a part of the filter element housing. Upon placement of the housing cover on the filter housing, the counter-guiding elements on the cover underside engage with the guiding elements on the side parts of the filter element, wherein the filter element undergoes displacement on the bottom of the filter housing due to the angular orientation of the guiding elements. With the displacement, the guidance elements located on the bottom part are displaced over the bottom of the filter housing. The guiding elements and the guidance elements on the filter element thus act functionally together, with the guiding elements undergoing a displacement component parallel to the bottom due to the application of the counter-guiding elements to the housing cover, and the filter element being displaced via the guidance elements. The guidance elements on the bottom part of the filter element may be guided into associated counter-guidance elements, which may be arranged on the inside of the filter housing.

The filter element is configured so as to be asymmetrical, according to another embodiment that refers to a filter element having a first filter medium body and a second filter medium body in a common filter element housing, wherein the filter medium bodies delimit a common clean space from which the purified fluid is to be discharged via an outflow opening. The asymmetry is achieved by the outflow sides and/or the inflow sides of the first and second filter medium bodies having different orientations relative to the longitudinal axis of the filter device. For example, one outflow side may run parallel to the longitudinal axis of the filter element, whereas the outflow side of the second filter medium body is then at an angle to the longitudinal axis, the angle preferably being in an angle range of greater than 0° but less than 45°, e.g., 10°, 15°, or 20°. This, with the simultaneously cuboid embodiment of the filter medium bodies, results in a configuration in the form of an oblique-angled V that enables additional possibilities of design and adaptation to different installation spaces and installation situations.

The asymmetric filter element may optionally be combined with the above-described embodiments and advantageous designs, especially with regard to the different sizes and/or shapes of the filter medium bodies. The angular embodiment of the second filter medium body to the longitudinal axis of the filter element may be achieved through a corresponding angular positioning of a cuboid filter medium body to the longitudinal axis.

The filter element housing of the filter element may have a single-part or multiple-part design, e.g., a four-part design. With a single-part design, the filter element housing advantageously has lateral insertion openings for inserting the filter medium bodies. With a multiple-part design, the filter element housing is composed of, for example, the bottom part, the cover part, and the side parts, which are assembled together into the filter element housing.

The outflow tube, which is attached to the outflow opening in the filter element housing, may be integral with or separate from the filter element housing. Different positions and arrangements of the outflow tube on the filter element may be considered. When the two filter medium bodies of the filter element have different heights, the outflow tube can run parallel to the upper edge or upper side of the lower of the filter medium bodies; in this embodiment, the outflow tube advantageously lies at least partially above the lower of the filter medium bodies. Another possible embodiment is one in which the outflow tube runs orthogonal to the upper edge or upper side of a filter medium body. Optionally, the outflow tube lies at an angle between 0° and 90° to the upper edge or upper side of a filter medium body.

When cuboid, the filter medium bodies may have upper sides that lie parallel to one another, so that with an orthogonal orientation, the outflow tube is arranged between the two filter medium bodies and points vertically upwards. According to yet another advantageous embodiment, the outflow tube runs at an angle to the upper side of at least one filter medium body, wherein the angle is greater than 0° and less than 90°. It may, for example, be advantageous with filter medium bodies of different heights for a cover part of the filter element housing to have an obliquely-running, ramp-shaped section through which the different heights are compensated, wherein the outflow opening between the first and second filter medium bodies is inserted into the obliquely-running section. The outflow tube, attached hereto, may optionally be oriented orthogonally to the plane of the obliquely-running section and thus at an angle to the upper side of one filter medium body.

Alternative to an intrinsically level, oblique ramp between the two filter medium bodies in the cover part of the filter element housing, it would also be conceivable to have a curved section, in particular, a section curved convexly outward, or, optionally, a section curved concavely inward.

The outflow tube may be intrinsically rectilinear, or may be curved. In addition, circular cross-sections may be considered, and oval or other, non-circular cross-sections may also be considered. The outflow tube may have a constant cross-section over the length thereof, or, according to other alternatives, the outflow tube may have a varying cross-section, e.g., a smaller cross-section at the outflow opening than the cross-section in the region of the free end face. In the latter configuration, for example, the outflow tube opens outwardly in the shape of a trumpet or a cone. Even the shape of the cross-section may optionally change over the length of the outflow tube; for example, the outflow tube may be in the shape of an ellipse at the outflow opening and be provided with a circular cross-section at the opposite, free end face.

It is furthermore possible for the free end face of the outflow tube to lie in a plane orthogonal to the longitudinal axis of the outflow tube, or, according to an alternative embodiment, in an oblique plane that runs at an angle other than 90° to the longitudinal axis of the outflow tube.

According to yet another advantageous embodiment, two or more outflow openings are incorporated into the filter element, one outflow tube being associated with each one thereof. It may, for example, be advantageous to provide precisely two outflow openings, each with an outflow tube, advantageously arranged adjacent to one another and, in particular, incorporated into the cover part of the filter element housing. The outflow tubes run, for example, parallel to one another. It may be advantageous for the outflow openings and the outflow tubes to have cross-sections of different sizes.

According to yet another advantageous embodiment, at least one filter medium body is angular. The filter medium body has, for example, two cuboid sections that stand at an angle to one another and are configured as an integral component. The second filter medium body may optionally also be angular, or cuboid, or may have another basic shape.

BRIEF DESCRIPTION OF THE DRAWINGS

Further benefits and advantageous embodiments are described in the other claims, the description of the figures, and the drawings.

FIG. 6 illustrates an exploded view of a filter device, having a filter element for insertion into a filter housing, inclusive of a housing cover;

FIG. 7 illustrates the filter element according to FIG. 5, in another perspective view;

FIG. 8 illustrates the filter element according to FIG. 5, in yet another perspective view;

FIG. 9 illustrates an exploded view of a filter element in another embodiment variant;

FIG. 10 illustrates the filter element from FIG. 9, in an assembled state;

FIG. 11 illustrates an exploded view of a filter element in another embodiment variant;

FIG. 12 illustrates the filter element from FIG. 11, in an assembled state;

FIG. 22 illustrates a filter element in a similar embodiment variant to FIG. 21, wherein the outflow tube has a cross-section that changes over the length thereof;

FIG. 23 illustrates a frontal view of the embodiment according to FIG. 22;

FIG. 24 illustrates a filter element in another embodiment variant, having two outflow openings or outflow tubes;

Figure 1:
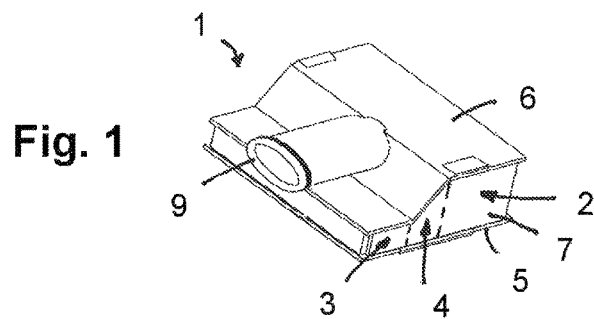
FIG. 1 illustrates a perspective view of a filter element having two cuboid, separately-configured filter medium bodies of different heights, between which there lies a common clean space, with an outflow tube that runs above the lower filter medium body.

In the drawings, like components are assigned like reference signs.

DESCRIPTION OF THE INVENTION

Figure 2:
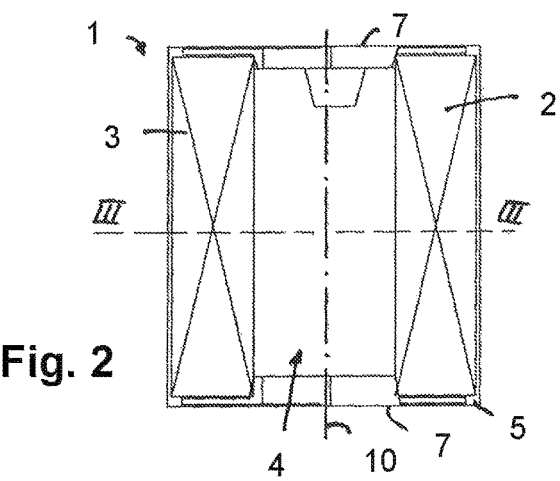
FIG. 2 illustrates a plan view of the filter device according to FIG. 1.
Figure 3:
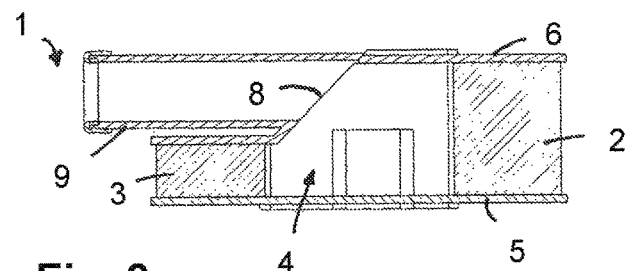
FIG. 3 illustrates a cross-section along the line III-Ill in FIG. 2.

FIG. 1-3 depict a first embodiment, with a filter element 1 for a filter device for gas filtration. The filter element 1 forms one component and includes a first filter medium body 2 and a second filter medium body 3 having a clean space 4 lying between the filter medium bodies 2, 3 in a filter element housing having a bottom part 5 and a cover part 6, as well as side parts 7 arranged on opposite sides. The filter element housing forms a carrier body, for receiving the filter medium bodes 2, 3, which are fitted into opposite receiving pockets on the filter element housing.

In addition, an outflow tube 9 that is also a part of the filter element 1 is attached to an outflow opening 8, which is incorporated into the cover part 6 of the filter element housing. The flow goes out through the outside of each of the filter medium bodies 2, 3 in the direction of the clean space 4, which is delimited by the outflow sides of the filter medium bodies 2, 3 and by the parts of the filter element housing. The purified fluid flows out from the clean space 4 via the outflow opening 8 and the outflow tube 9.

The filter medium bodies 2, 3 are arranged between a bottom part 5 and cover part 6, as well as the side parts 7. The clean space 4 is delimited laterally by the outflow sides of the filter medium bodies 2 and 3, at the end faces by the side parts 7, and downwards and upwards by the bottom part 5 and the cover part 6, respectively.

The filter medium bodies 2, 3 are each cuboid and have a rectangular basic cross-section, which is identical for each of the filter medium bodies 2, 3. The two filter medium bodies 2, 3 lie parallel to one another, or to the longitudinal axis 10. The filter medium bodies 2, 3 do differ, however, in the height thereof, as shown in FIGS. 1 and 3; in the second embodiment, the first filter medium body 2 is more than twice as high as the second filter medium body 3. The height difference is bridged by the cover part 6, which has an obliquely-running section, into which is introduced the outflow opening connected to the clean space 4 and attached to the outflow tube 9.

The cuboid filter medium bodies 2, 3 run parallel to the longitudinal axis 10 of the filter element 10. The outflow tube 9 is oriented transversely to the longitudinal axis 10 and extends above the lower second filter medium body 3; the outflow tube 9 does not extend here up beyond the cover part 6, such that the overall height of the filter element 1 is determined by the height difference between the bottom part 5 and the cover part 6. As shown by FIG. 3, the outflow tube 9 projects out laterally over the outflow side of the lower, second filter medium body 3.

Figure 4:
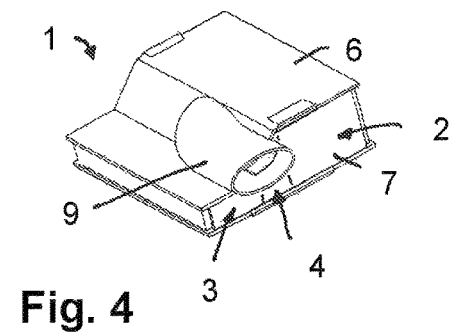
FIG. 4 illustrates a perspective view of a filter element in a modified embodiment, with which the outflow tube is formed so as to be curved.

FIG. 4 depicts another embodiment for a filter element 1, which, as is also the case in FIGS. 1 to 3, is provided with two cuboid filter medium bodies 2, 3 that delimit a clean space 4 lying therebetween. The height of the second filter medium body 3 is lower than that of the first filter medium body 2, wherein the outflow tube 9 branches into the obliquely-running section of the cover part 6. Unlike the first embodiment, the outflow tube 9 is curved, and extends up beyond a side part 7.

Figure 5:
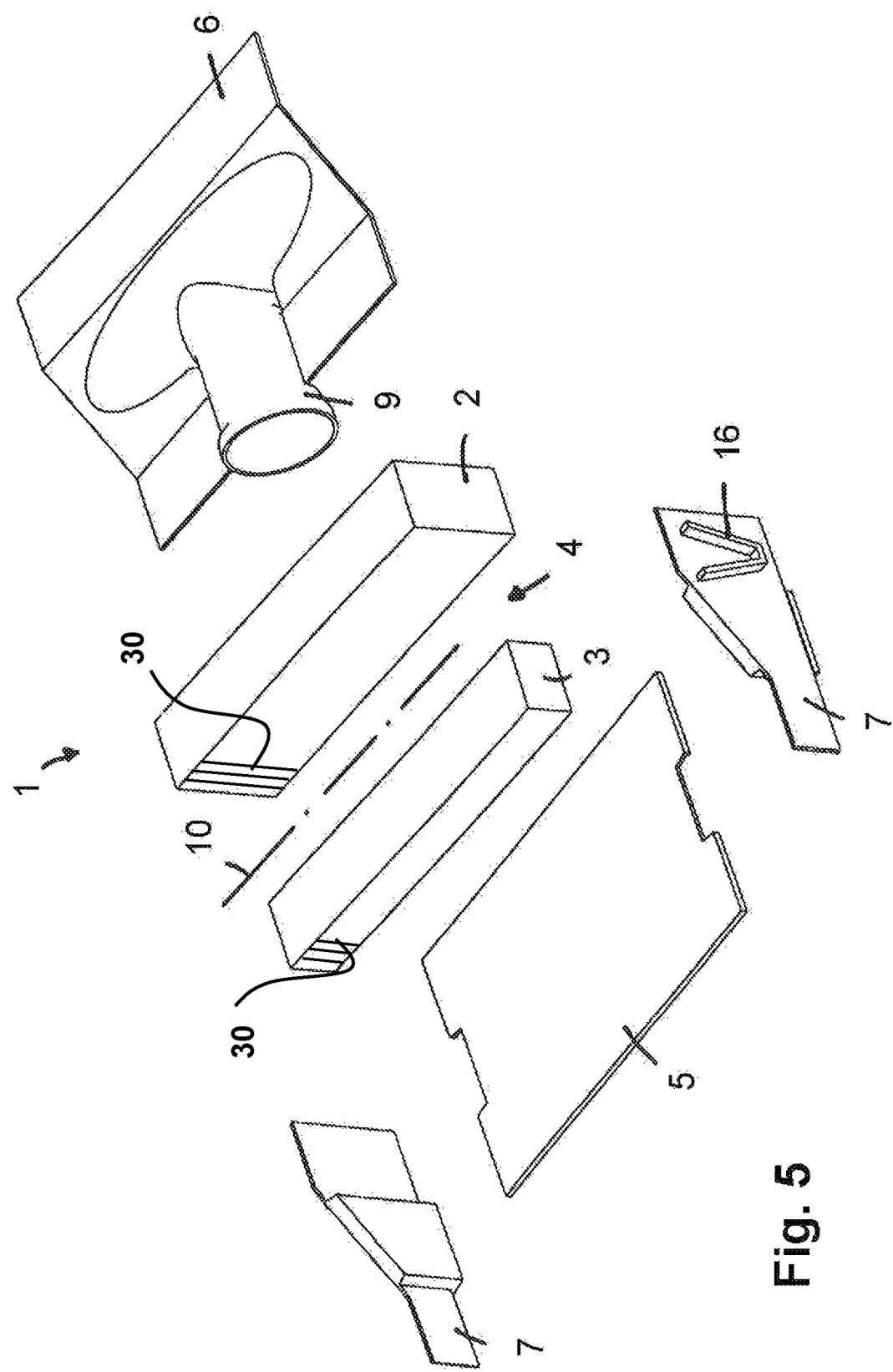
FIG. 5 illustrates an exploded view of a filter element having two filter medium bodies for insertion into a filter element housing.

FIG. 5 depicts another embodiment of a filter element 1. The two filter medium bodies 2, 3 have a cuboid shape with the same basic cross-section, wherein the first filter medium body 2 is higher than the second filter medium body 3. The second filter medium body 3 has, on an upper side thereof, a centrally-located, partially-circular recess serving to accommodate the outflow tube 9, which is configured integrally with the cover part 6 and extends transversely to the longitudinal axis 10. This makes it possible to arrange the outflow tube 9 so as to lie deeper than the upper side of the cover part 6, thus enabling installation of the filter element 1 in an installation space of limited height. The pleat ridges 30 of the filter medium bodies 2, 3, which are configured as pleated filters, are indicated by way of example.

FIG. 6 depicts a filter device having a filter housing 12 and a housing cover 13, wherein a filter element 1 according to FIG. 5 can be inserted into the filter housing 12. FIGS. 7 and 8 illustrate different perspective views of the filter element 1 from FIG. 5.

The filter housing 12 includes two inflow tubes 14 through which the pre-filtration fluid to be purified is supplied to the two opposite outer sides of the filter element 1, which form the post-filtration side or inflow side of the filter medium bodies. An outflow tube 15, which is aligned with the outflow tube 9 of the filter element 1 in the mounted state, branches off from an accommodation space in the filter housing 11 into which the filter element 1 can be inserted.

The two opposite side parts 7 of the filter element housing of the filter element 1 each have, on the outer side thereof, a guiding element 16 that is V-shaped, with the open side of the V facing up. The legs of the V-shaped guiding element 16 are inclined relative to the bottom part 5 of the filter element 1. A counter-guiding element on the underside of the housing cover 13 engages with each of the guiding elements 16 as soon as the housing cover 13 is placed on the filter housing 12. This causes the filter element 1 to undergo an advancing movement within the filter housing 12 in parallel with the bottom thereof. This makes it possible to bring the filter element 1 to the final position thereof in the filter housing 12 and lock the filter element 1 in this position, in which the outflow tube 9 of the filter element 1 is fluidly connected to the outflow tube 15 of the filter housing 12.

In FIG. 8, guidance elements 11 are arranged on the underside of the filter element 1, on the bottom part 5 adjacently to the side parts 7, the guidance elements having the function of reliably guiding the filter element 1 on the bottom of the filter housing 12 to the final mounting position as soon as the mounted housing cover 13 displaces the filter element 1 in the direction of the final position, through the guiding elements 16.

In the embodiment according to FIGS. 9 and 10, the two filter medium bodies 2, 3 of the filter element 1 are also provided with a rectangular basic cross-section, and have the same length as well as the same width. The first filter medium body 2 is cuboid, whereas the second filter medium body 3 has a ramp-shaped transition between a lower plateau and an upper plateau. The lower plateau is significantly lower than the upper plateau, which has the same height as the first filter medium body 2, whereas the lower plateau has less than half the height. Overall, the ramp-shaped filter medium body 3, together with a cover element 6 of the filter element housing—which is guided downwards in the region of the ramp-shaped drop on the filter medium body 3—makes it possible to reduce the height of the filter element into a corner region. The outflow tube 9 is led into this reduction in height, the outflow tube 9 being configured as a part of the cover part 6 and communicating with the clean space 4 in the mounted state. The outflow tube 9 extends up beyond the outer sides of the filter element 1, and is located directly above a side part 7. The pleat ridges 30 of the filter medium bodies 2, 3, which are configured as pleated filters, are indicated in FIG. 9 by way of example.

In the embodiment according to FIGS. 11 and 12, the filter medium bodies 2 and 3—which are each cuboid—are configured so as to have different lengths and different heights. The first filter medium body 2 is shorter in length, but greater in height than the second filter medium body 3. Both of the filter medium bodies are cuboid and extend parallel to the longitudinal axis 10 on the two sides of the clean space 4. The two filter medium bodies have different numbers of pleats.

The length difference between the two filter medium bodies 2 and 3 is reflected also in the cross-sectional shape of both the bottom part 5 and the cover part 6. The cover part 6 also has an obliquely-running middle section that bridges the height difference between the filter medium bodies 2 and 3.

The outflow tube 9, which communicates with the clean space 4, is incorporated into a side part 7 on the end face of the clean space 4. The outflow opening 8 of the outflow tube 9 lies on the inner side of the side part 7, which faces in to the clean space 4.

Figure 13:
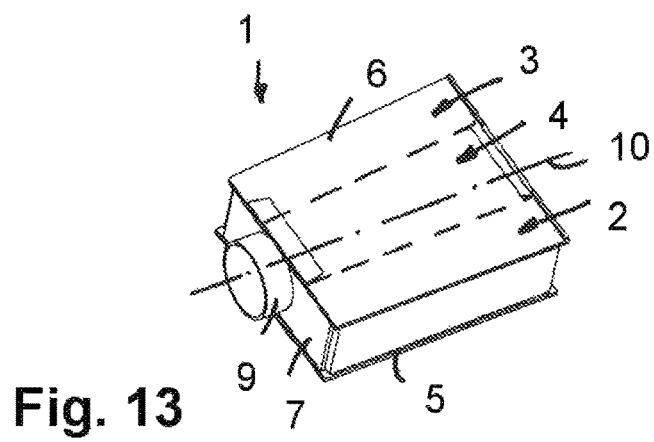
FIG. 13 illustrates a filter element in another embodiment variant.

FIG. 13 depicts another embodiment of a filter element 1, with which the two filter medium bodies 2 and 3, which delimit the clean space 4 lying therebetween, are each cuboid, wherein, however, only the first filter medium body 2 runs parallel to the longitudinal axis 10 of the filter element 1, whereas the second filter medium body 3 lies at an angle to the longitudinal axis 10. The two filter medium bodies 2 and 3 are preferably identically constructed and have the same dimensions. The oblique inclination of the second filter medium body 3 relative to the longitudinal axis 10 results in a clean space 4 that has a trapezoidal basic cross-section.

Figure 14:
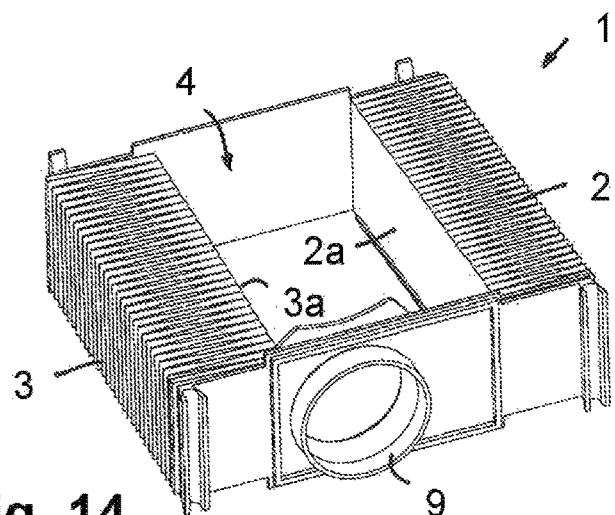
FIG. 14 illustrates a perspective view of a filter element, having two filter medium bodies implemented as pleated filters.
Figure 15:
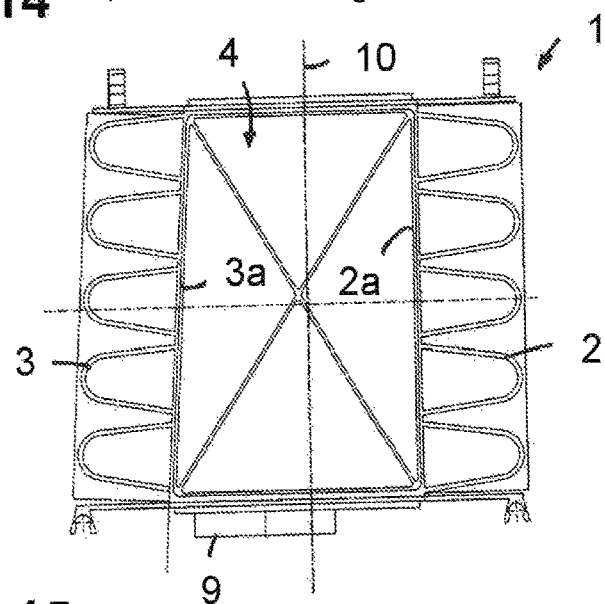
FIG. 15 a plan view of the filter element according to FIG. 14.

FIGS. 14 and 15 depict another embodiment with a filter element 1, which has two filter medium bodies 2 and 3 that are configured as pleated filters. The pleats extend between the externally-located inflow side or pre-filtration sides of the filter medium bodies, and the internally-located outflow side or post-filtration sides 2a, 3a adjoining the clean space 4. The filter medium bodies 2 and 3 are each cuboid and may have the same dimensions.

The filter medium bodies 2 and 3 differ in terms of the angular orientation thereof relative to the longitudinal axis 10 of the filter element 1. The first filter medium body 2 is oriented parallel to the longitudinal axis 10, so that the outflow side 2a thereof also runs parallel to the longitudinal axis 10. The outflow side 3a of the second filter medium body 3, however, forms an angle with the longitudinal axis 10, the angle being in an angle range of greater than 5° and less than 10° in the embodiment. Due to the cuboid configuration of the filter medium body 3, the outer side or outflow side—which runs parallel to the outflow side 3a—also forms an angle with the longitudinal axis. With the first filter medium body 2, however, due to the parallel orientation, the inflow side is also parallel to the longitudinal axis 10.

Due to the angular arrangement, the narrow side of the filter medium body 3, which lies above in FIG. 15, is indented in the direction of the clean space 4, whereby a larger flow path for the flow into the filter medium body 3 on the pre-filtration side is formed on the outside. This makes it possible, for example, for the pre-filtration air to be first guided with minimal flow resistance to the first filter medium body 2, and then guided around the filter element 1, and subsequently directed to the inflow long side of the filter medium body 3 via the indented narrow side.

Figure 16:
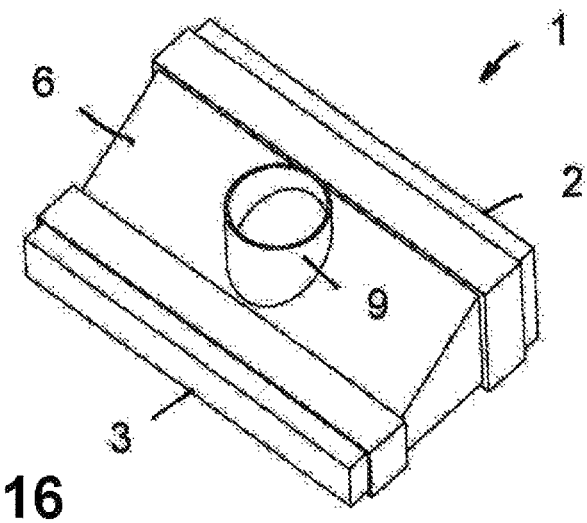
FIG. 16 illustrates the filter element in another embodiment variant, in which the outflow tube runs orthogonally to the upper sides of the cuboid filter medium bodies.

In the embodiment according to FIG. 16, the filter element 1 is—similar to the first embodiment according to FIG. 1—provided with two cuboid filter medium bodies 2 and 3 in a filter element housing, wherein the filter element housing has, on opposite sides, respective receiving pockets for receiving the filter medium bodies 2, 3. The filter medium bodies 2, 3 are cuboid but each have different heights. The cover part 6, which is part of the filter element housing, has a section that is configured in the form of an oblique ramp, between the two filter medium bodies 2, 3. Incorporated into this oblique section of the cover part 6 are the outflow opening and the outflow tube 9, the latter of these being oriented orthogonally to the upper sides of the two filter medium bodies 2, 3 in the embodiment according to FIG. 16.

Figure 17:
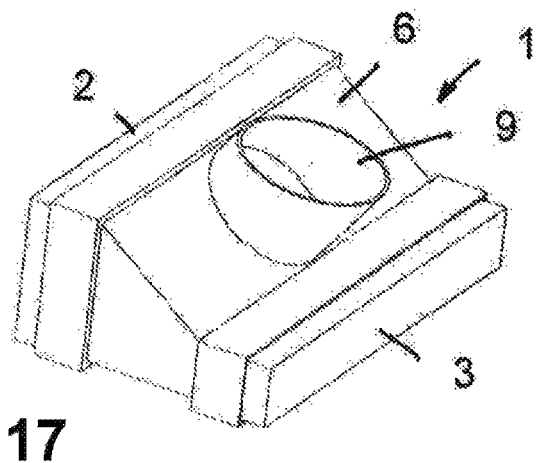
FIG. 17 illustrates a filter element in an embodiment variant having an obliquely-inclined outflow tube.

In the embodiment according to FIG. 17, as well, the filter element 1 has two cuboid filter medium bodies 2, 3 of different sizes in the filter element housing. The outflow tube 9 is also incorporated into the beveled section of the cover part 6, but the longitudinal axis of the outflow tube 9 extends orthogonally to the oblique section of the cover part, and thus angularly to the upper sides of the cuboid filter medium bodies 2, 3.

Figure 18:
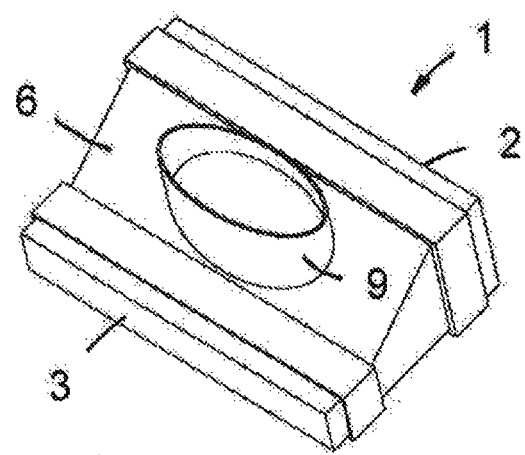
FIG. 18 illustrates a filter element in an embodiment variant having an oval outflow tube.

The embodiment according to FIG. 18 corresponds essentially to the one according to FIG. 17, but differs in that, according to FIG. 18, the outflow tube 9 has an oval cross-section whereas in FIG. 17 the outflow tube 9 has a circular cross-section. Both in FIG. 17 and in FIG. 18, the free end face of the outflow tube 9 is beveled and is at an angle relative to the outflow tube longitudinal axis.

Figure 19:
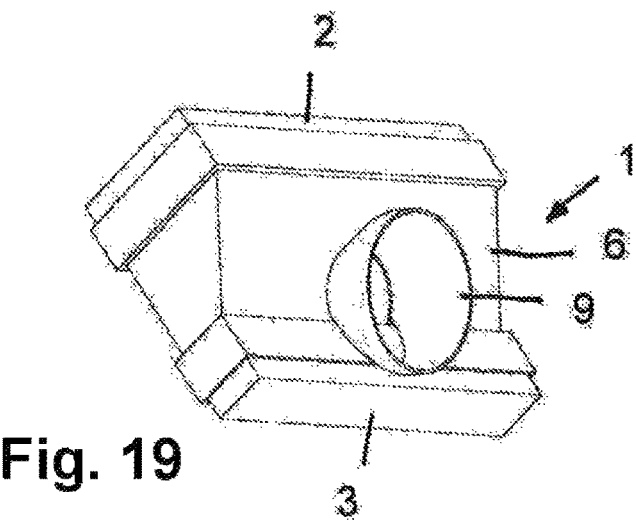
FIG. 19 illustrates a filter element in an embodiment variant having a concavely-opening outflow tube.

In the embodiment according to FIG. 19, the outflow tube 9 is also incorporated into the oblique section of the cover part 6 of the filter element housing. However, the outflow tube 9 does not have a constant cross-section over the length thereof, but rather expands in width conically in the direction of the free end face thereof. The outflow opening and the outflow tube 9 are arranged with an offset in the direction of the smaller filter medium body 3, such that the outflow tube 9 extends above the smaller filter medium body 3.

Figure 20:
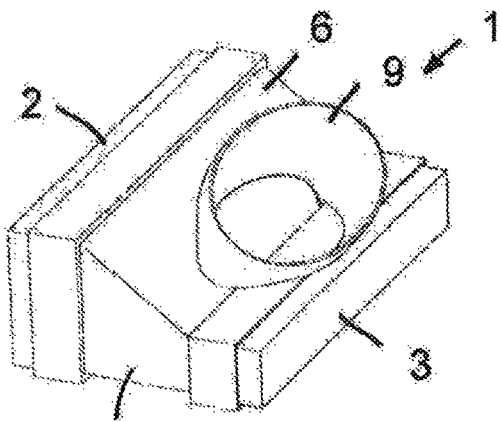
FIG. 20 illustrates a filter element in an embodiment variant having an outflow tube that also opens concavely and is arranged at an angle.

The embodiment according to FIG. 20 largely corresponds to the one according to FIG. 19, with a conically expanding outflow tube 9 that is additionally inclined to the side so that the longitudinal axis of the outflow tube 9 is inclined at an angle to the parallel upper sides of the filter medium bodies 2, 3 on the one hand, and also inclined at an angle to the side parts 7 of the filter element housing on the other.

Figure 21:
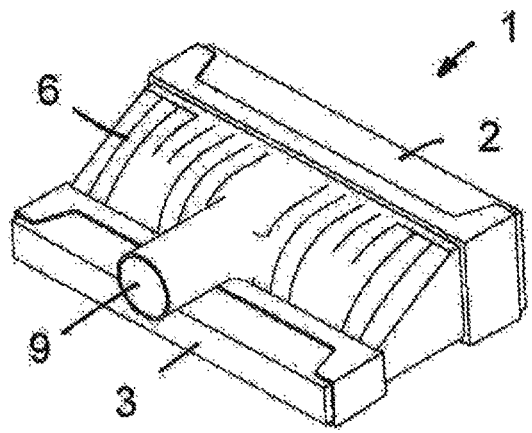
FIG. 21 illustrates a filter element in an embodiment variant in which a cover element of the filter element housing is convexly curved.

In the embodiment according to FIG. 21, the section of the cover part 6 that connects the two cuboid filter medium bodies 2, 3 of different sizes is curved concavely outward. The outflow tube 9 runs above the upper side of the smaller cuboid filter medium body 3 and is oriented parallel to the upper side.

In the embodiment according to FIG. 22, as well, the section of the cover part 6 between the two cuboid filter medium bodies 2, 3 of different heights is curved concavely outward. The two filter medium bodies 2, 3 do not lie parallel to one another, but rather at an angle, so that, for example, the upper sides of the two filter medium bodies stand at an angle to one another. The outflow tube 9 lies on the upper side of the smaller filter medium body 3. In addition, the cross-section is variable over the length of the outflow tube 9, wherein the outflow opening 8—as shown in FIG. 23—is approximately oval and the free end face of the outflow tube 9 has a circular cross-section.

In the embodiment according to FIG. 24, two outflow openings that are each connected to outflow tubes 9a, 9b respectively are incorporated into the cover part 6 of the filter element housing 17. The two outflow tubes 9a, 9b each have a circular cross-section, but the cross-sectional areas are of different sizes. The two rectilinear outflow tubes 9a, 9b run parallel to one another.

The larger outflow tube 9a extends into the receiving pocket for the smaller filter medium body 3, which is partially circularly beveled in the region of the end face thereof, and is adapted thereby to the outer contour of the larger outflow tube 9a.

Figure 25:
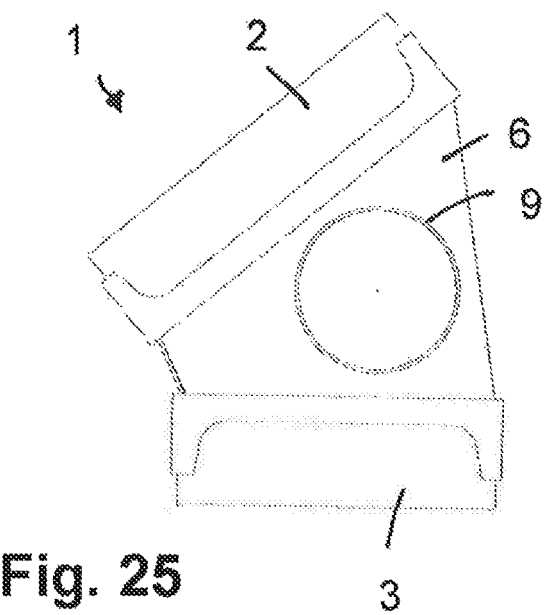
FIG. 25 illustrates a plan view of a filter element in an embodiment variant having two cuboid filter medium bodies that are configured so as to have different sizes and are arranged at an angle to one another.

In the embodiment according to FIG. 25, the two filter medium bodies 2, 3, which are each cuboid, are arranged at a relatively large angle to one another, the angle being approximately 45°. The two filter medium bodies 2, 3 are each cuboid but each have different lengths.

Figure 26:
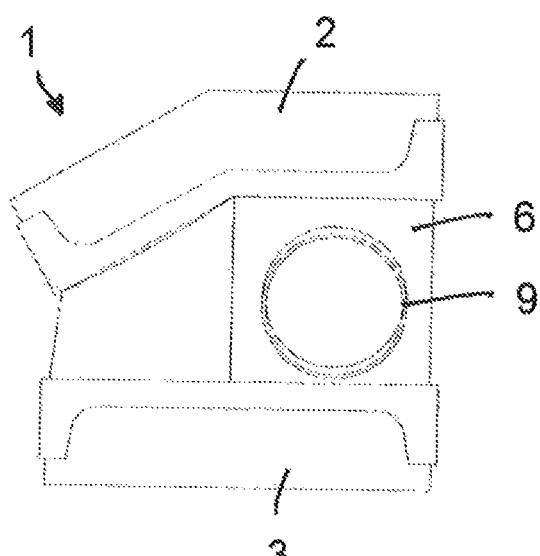
FIG. 26 illustrates a filter element in another embodiment variant, in which one filter medium body is configured so as to be angled.

In the embodiment according to FIG. 26, the first filter medium body 2 is angular in shape, whereas the second filter medium body 3 is cuboid. The angle between the two sections of the first filter medium body 2, which are integral with one another, is approximately 30°. One of the sections of the first filter medium body 2 lies parallel to the first filter medium body 3, and the second, angularly-arranged sections is at an angle so as to also correspond to the second filter medium body 3.

Figure 27:
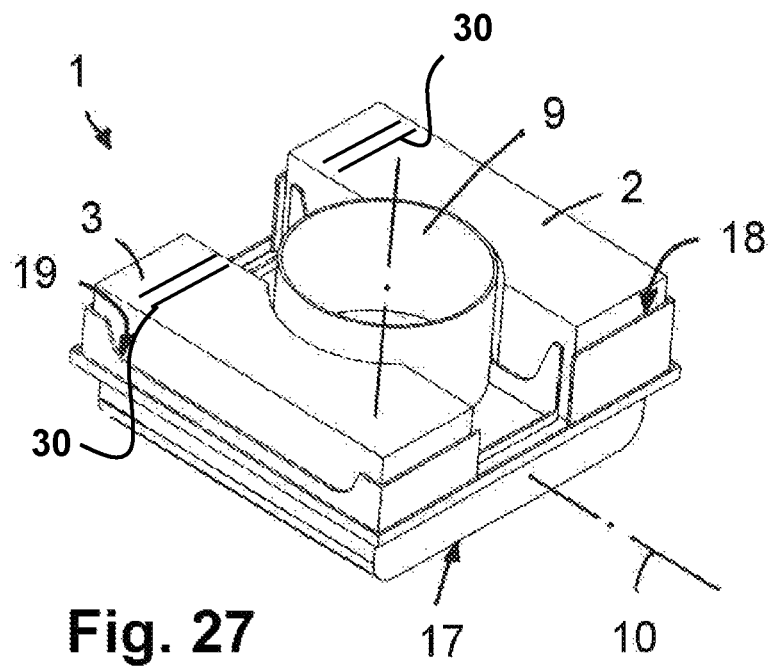
FIG. 27 illustrates another embodiment of a filter element having filter medium bodies that are offset in parallel on the same side of the filter element.
Figure 28:
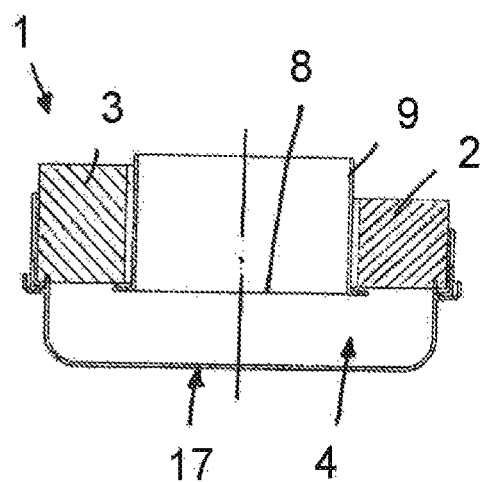
FIG. 28 illustrates a cut transverse to the longitudinal axis through the filter element according to FIG. 27.

In the embodiment according to FIGS. 27 and 28, the receiving pockets 18 and 19 of the filter element housing 17 and the filter medium bodies 2, 3 inserted therein are on the same side of the filter element housing, and are arranged in parallel to and offset from one another. Correspondingly, the flow into the filter medium bodies 2, 3 is through the same side. The pleat ridges 30 of the filter medium bodies 2, 3, which are configured as pleated filters, are indicated in FIG. 27 by way of example.

The two filter medium bodies 2, 3 have different heights. Each of the filter medium bodies is provided with a partially-circular recess through which the centrally-arranged outflow tube 9—which is located above the clean space 4—leads.

What is claimed is:

1. A filter element, comprising:
   a first filter medium body having an outflow side and an inflow side;
   a second filter medium body having an outflow side and an inflow side;
   wherein the filter element has a longitudinal axis;
   wherein the first and second filter elements are configured both install into and share in common a filter element housing in which the filter medium bodies delimit a shared common clean space from which the a purified fluid is to be discharged via at least one outflow opening;
   wherein the first filter medium body and the second filter medium body have different sizes and/or different shapes and/or different angular positions of the outflow sides adjoining the clean space;
   wherein the filter medium bodies have different heights at least in some sections;
   wherein an outflow tube attached to the outflow opening runs at least partially above the lower filter medium body;
   wherein the outflow tube has a central axis;
   wherein the outflow tube runs orthogonally or at an angle greater than 0 degrees and less than 90 degrees relative to an upper side of one of the filter medium bodies.

2. The filter element according to claim 1, wherein a diameter and/or a position of the outflow tube is dimensioned and arranged such that the outflow tube does not extend up beyond an upper side of the filter element.

3. The filter element according to claim 1, wherein the outflow tube runs parallel to a lower one of the filter medium bodies.

4. The filter element according to claim 1, wherein at least one of the filter medium bodies has an angular shape.

5. The filter element according to claim 1, wherein the filter element includes;
   a bottom part; and
   a cover part;
   wherein the filter medium bodies are accommodate between the bottom part and the cover part.

6. The filter element according to claim 5, including guidance elements configured for displaceable guidance of the filter element in a filter housing;
   wherein the guidance elements are arranged on the bottom part or on a side part of the filter element.

7. The filter element according to claim 5, including guiding elements arranged on opposite side parts of the filter element;
   wherein guiding elements extend at an angle relative to the bottom part of the filter element.

8. The filter element according to claim 1, wherein the filter element is asymmetrical; and
   wherein the outflow sides and/or the inflow sides of the first and second filter medium bodies have different orientations relative to the longitudinal axis of the filter element.

9. The filter element according to claim 8, wherein the outflow side of the first filter medium body runs parallel to the longitudinal axis of the filter element; and
   the outflow side of the second filter medium body is inclined relative to the longitudinal axis.

10. The filter element according to claim 2, wherein the central axis of the outflow tube lies outside of the longitudinal axis of the filter element.

11. The filter element according to claim 1, wherein the filter medium bodies have pleated filter media,
    wherein the pleats run at least approximately orthogonally to the longitudinal axis of the filter element and/or to the outflow direction through the outflow opening in the filter element housing and/or to the central axis of the outflow tube.

12. The filter element according to claim 1, wherein the each of the filter medium bodies is a pleated filter having pleated filter media;
    wherein the pleated filters have different numbers of pleats and/or the pleats of one pleated filter have a different pleat width from the pleat width of the other pleated filter.

13. A filter device, comprising:
    a filter element, including:
      a first filter medium body having an outflow side and an inflow side;
      a second filter medium body having an outflow side and an inflow side;
      wherein the filter element has a longitudinal axis;
      wherein the first and second filter elements are configured both install into and share in common a filter element housing in which the filter medium bodies delimit a shared common clean space from which a purified fluid is to be discharged via at least one outflow opening; and
      wherein the first filter medium body and the second filter medium body have different sizes and/or different shapes and/or different angular positions of the outflow sides adjoining the clean space;
    wherein the filter medium bodies have different heights at least in some sections;
      wherein an outflow tube attached to the outflow opening runs at least partially above the lower filter medium body;
      wherein the outflow tube has a central axis;
      wherein the outflow tube runs orthogonally or at an angle greater than 0 degrees and less than 90 degrees relative to an upper side of one of the filter medium bodies; and
    a filter housing receiving and accommodating the filter element.

14. A filter element comprising:
    a first filter medium body having an outflow side and an inflow side;
    a second filter medium body having an outflow side and an inflow side;
    wherein the filter element has a longitudinal axis;
    wherein the first and second filter elements are configured both install into and share in common a filter element housing in which the filter medium bodies delimit a shared common clean space from which a purified fluid is to be discharged via at least one outflow opening;
    wherein the first filter medium body and the second filter medium body have different sizes and/or different shapes and/or different angular positions of the outflow sides adjoining the clean space;
    wherein the filter medium bodies have different heights at least in some sections;

wherein an outflow tube attached to the outflow opening runs at least partially above the lower filter medium body;
wherein the outflow tube has a central axis;
wherein the filter element housing includes a cover part;
wherein the cover part has, between the filter medium bodies, an obliquely-running section into which the outflow opening is incorporated between the first and second filter medium bodies.

15. A filter element comprising:
a first filter medium body having an outflow side and an inflow side;
a second filter medium body having an outflow side and an inflow side;
wherein the filter element has a longitudinal axis;
wherein the first and second filter elements are configured both install into and share in common a filter element housing in which the filter medium bodies delimit a shared common clean space from which a purified fluid is to be discharged via at least one outflow opening;
wherein the first filter medium body and the second filter medium body have different sizes and/or different shapes and/or different angular positions of the outflow sides adjoining the clean space;
wherein the filter medium bodies have different heights at least in some sections;
wherein an outflow tube attached to the outflow opening runs at least partially above the lower filter medium body;
wherein the outflow tube has a central axis;
wherein the filter element includes two adjacent outflow openings.

16. The filter element according to claim 15, wherein the two adjacent outflow openings have cross-sections of different sizes.

17. The filter element according to claim 15, wherein an outflow tube is associated with each of the two adjacent outflow openings, and the outflow tubes run parallel to one another.

\* \* \* \* \*